Dec. 23, 1930.  A. MAZZA  1,786,215
METHOD AND APPARATUS FOR MAKING SEAMLESS PIPES
Filed Nov. 12, 1924    3 Sheets-Sheet 1
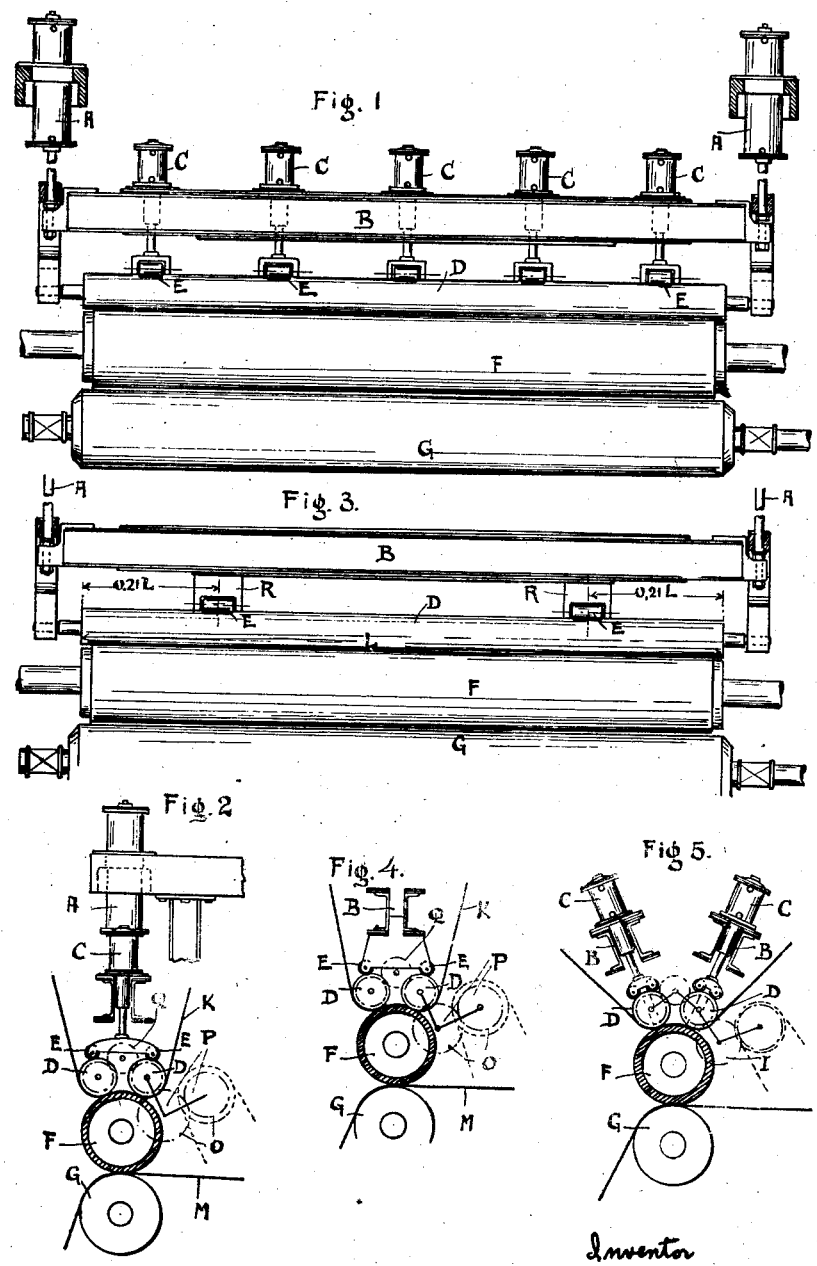
Inventor
Adolfo Mazza
by Knight Bro
attorne

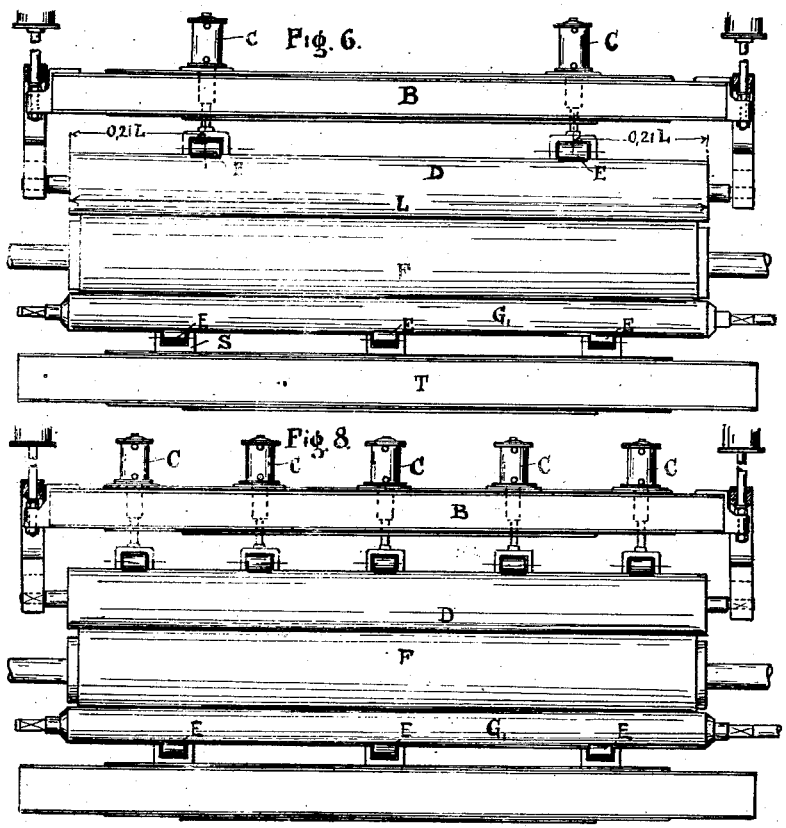
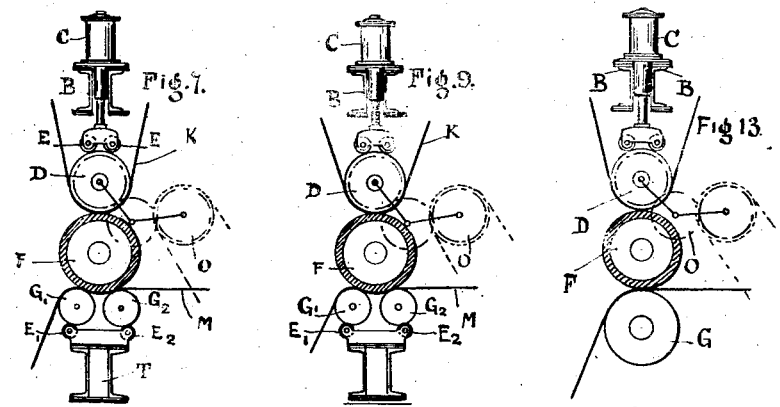

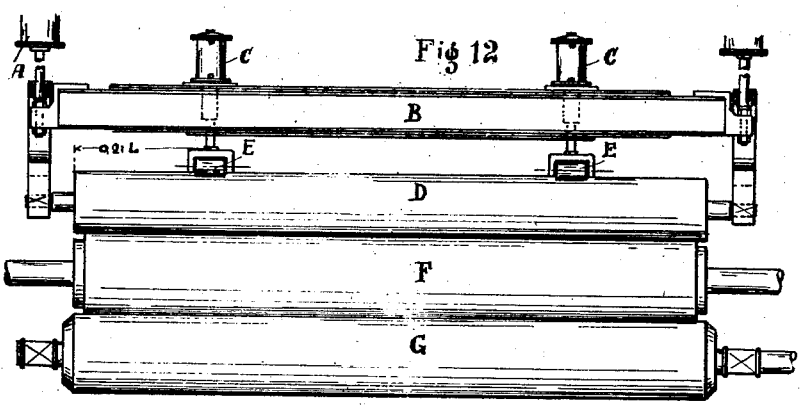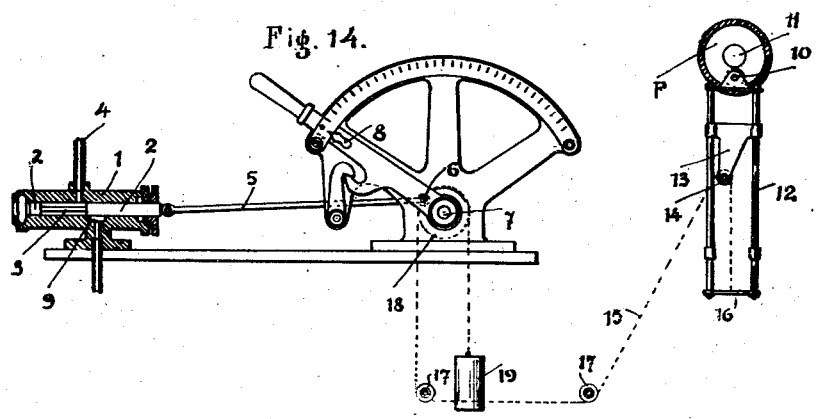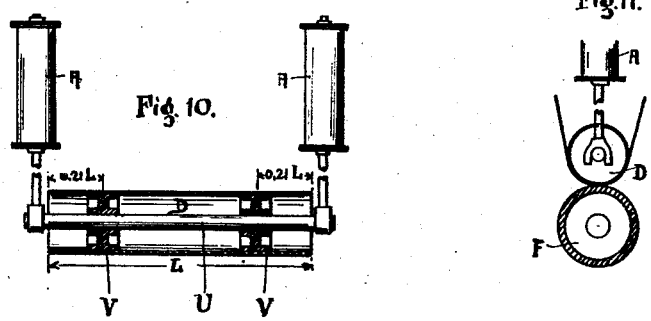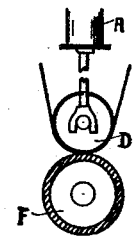

Patented Dec. 23, 1930

1,786,215

UNITED STATES PATENT OFFICE

ADOLFO MAZZA, OF GENOA, ITALY, ASSIGNOR, BY MESNE ASSIGNMENTS, TO JOHNS-MANVILLE CORPORATION, OF NEW YORK, N. Y., A CORPORATION OF NEW YORK

METHOD AND APPARATUS FOR MAKING SEAMLESS PIPES

Application filed November 12, 1924, Serial No. 749,556, and in Italy September 10, 1923.

This invention relates more especially to the manufacture of seamless pipes of fibrous matters such as asbestos fibre and hydraulic cement and contemplates an improved method for building up pipes, from materials of this character in a manner somewhat analogous to that of a paper manufacturing machine. It is well known that a pipe of cement and asbestos offers at any point of its length the same resistance, if the mixture has been equally distributed and pressed. The resistance of a piping of cement and asbestos will depend also upon the percentage of cement in the mixture. These conditions depend upon the quantity of water contained in the mixture and the best results are obtained only when the quantity of the water is exactly in the proper proportion for satisfying said conditions. Therefore it is necessary not only that the pressure exerted upon the pipe during the manufacturing be uniform and sufficient to give the mixture the greatest possible density, but this pressure must also be sufficient to eliminate the surplus of water which otherwise hinders the proper setting of the cement. In manufacturing these pipes it is important that the pressure exerted on the pipe be proportional to the progressive increase of the thickness of the wall. Nevertheless, it is indispensable that the pressure be sufficient to satisfy the aforesaid conditions even when such pressure is lowest.

In the present embodiment of my invention, the pressure is obtained by hydraulic means in order that the pressure may be properly regulated. The usual method which consists in exerting a mechanical pressure by weighted pressure rollers under constant pressure cannot give desired results due to the fact that it is not possible by this means and at will to increase the pressure to a high degree.

The removal of water contained in the mixture of cement and asbestos may be effected not only by pressure upon the rotating roller during the formation of the pipe, but also by the aid of other devices placed at appropriate points of the machine to allow the pressing of the mixture and strips of felt.

This pressure may be obtained in many ways and hereinafter some examples of suitable devices for this purpose will be set forth.

Moreover it is necessary to take measures for reducing as much as possible the resistances due to frictional stresses to which the mixture will be exposed on the rotating roller owing to the strong pressure exerted upon this latter by the pressure cylinders. It is important that the resistance to the pasty mixture during rotation be reduced as far as possible to avoid calendering of the tube and also to increase the strength of its wall. This result may be obtained by controlling the pressure cylinders by means of a toothed wheel gearing to be displaced accordingly to the displacement of the roller or of the pressure cylinders. It is impossible to obtain this effect when the pressure rollers are driven by means of a felt strap and this is due to the fact that, irrespective of the inefficient arrangement of the pressure cylinder with respect to the felt, folds would be formed which would interfere with the regular operation of the apparatus and rapidly render the felt useless.

The present invention provides a device owing to which a high and uniform pressure is exerted on the entire mass of the mixture during the formation of the pipe and in such a manner that the excess of water will be eliminated, the resistances due to friction reduced to a minimum and the pipe rendered more compact.

In the annexed drawings various embodiments of the machine for carrying out this invention are shown.

Fig. 1 is a front view of an arrangement comprising 5 hydraulic pressure cylinders which are distributed longitudinally with respect to the rotating cylinder.

Fig. 2 is a side elevation thereof.

Fig. 3 shows another embodiment wherein the two pressure cylinders exert pressure on two points so that they may produce along their entire length an always uniform pressure.

Fig. 4 is a side elevation thereof.

Fig. 5 shows in side elevation a modified form wherein the two pressure cylinders are arranged in two systems in order to exert an angular action upon the rotating cylinder.

Figs. 6 and 7 are respectively a front view and a side elevation wherein a single pressure cylinder is acting upon the rotating cylinder which latter in its turn is acting upon two small cylinders.

Figs. 8 and 9 show respectively a front view and a side elevation of a further modified form.

Figs. 10 and 11 show the details of another embodiment to be used either in the case where the rotating roller acts upon a single large roller, or else when the same is acting upon two small rollers.

Figs. 12 and 13 are respectively a front view and a side elevation of a device wherein a single pressure cylinder acts upon the rotating cylinder which latter is acting upon a single large roller.

Fig. 14 shows an apparatus for controlling automatically the pressure exerted by the pressure cylinder or cylinders.

In the arrangement shown in Figures 1 and 2, A—A indicate two hydraulic cylinders adapted to raise the whole of the pressure mechanism constituted by the pressure cylinders D, D and the cross bar B whereupon are mounted five small hydraulic cylinders C the pistons whereof are connected to small rolls E resting upon the pressure cylinders D.

After the cross bar B has been put in the position required by the cylinders A whereinto and above said pistons a liquid is introduced by means of a suitable device, the said small cylinders C are caused to exert a pressure upon the pressure cylinders D by means of small rollers E so that the pressure of the various small cylinders C is uniformly distributed along the entire length of the pipe formed by the large cylinder F which rests upon the cylinder G thereunder. Around the cylinder G a felt M is passed which supplies to the turning cylinder F the mixture of cement and asbestos fibre. Around the pressure cylinders D a felt K is passed which by means of the cylinders D is pressed against the pipe which is being formed on the cylinder F.

The cylinders D are driven by a gearing couple O one member whereof is carried by the link between two rings P in such a manner that the gearing couple will always engage the pressure cylinders D while they are being raised during the pipe-forming operation. Between the two cylinders D a gearing wheel Q is provided.

The pressure exerted on the cylinder or cylinders D will decrease gradually and proportionally with the increase of the strength of the pipe being manufactured. This decrease of pressure is automatically effected by hydraulic means operated by the mechanism indicating the thickness of the tube.

This operation may be preferably carried out in the following manner.

A small cylinder 1 (Fig. 14) receives a small double piston controlling the pressure within a space 3 connected by means of a piping 4 to the pumps imparting pressure on the pipes through the small cylinders C. Consequently the pressure within the space 3 will be equal to that within the cylinders C: this pressure does not produce a displacement of the piston 2 in one direction or the other because the piston surfaces enclosing the space 3 are of the same area and will thus balance another.

To one end of the small piston 2 is connected a connecting rod 5 the other end thereof being connected to an eccentric 6 which is mounted in such a manner as to be adjustable along an oscillating shaft 7 carrying a pointer 8 which moves over a scale to indicate the strength of the pipe. The said shaft is connected to the shaft 11 of the rotating cylinder F by means of a chain driven mechanism so that the shaft 7 will be rotated accordingly to the vertical movement of the shaft 11 which displaces itself vertically as the thickness of the pipe being formed by the rotating cylinder F increases.

As shown in the drawing the device comprises a frame 12 which is movably mounted on a support 13 fastened on the apparatus. Said support carries on its upper end a roller 10 contacting with the shaft 11. On said support is mounted a roller 14 over which passes a chain 15 which chain is fastened on the end of the frame 12 as shown at 16. The chain 15 passes over the guide rolls 17 and a chain wheel 18, said chain wheel being keyed to the shaft 7. The free end of the chain carries a counter-weight 19 adapted to maintain an uninterrupted contact between roller 10 and shaft 11. While the thickness of the pipe is increasing on the rotating cylinder F, the shaft 11 is rising vertically and owing to the action of weight 19 the frame 12 and the roll 10 will follow this vertical movement. The vertical movement of the frame 12 will cause the chain-wheel 18 as well as the shaft 7 and the eccentric 6 to be rotated. The said eccentric disc acts in this way on the piston 2 by means of the piston-rod 5. The piston 2 in displacing itself within its cylinder I will gradually open an exhaust opening 9 so that by increasing the thickness of the pipe the said opening will become gradually larger. In this manner the pressure in the chamber 3 and in consequence the pressure acting on the pistons within the cylinder C will diminish. It will be seen that in this way the pressure diminishes uniformly, and, in relation to the enlargement of the exhaust opening 9, owing to the increase in the thickness of the pipe so that while forming the pipe the